Patented Nov. 7, 1950

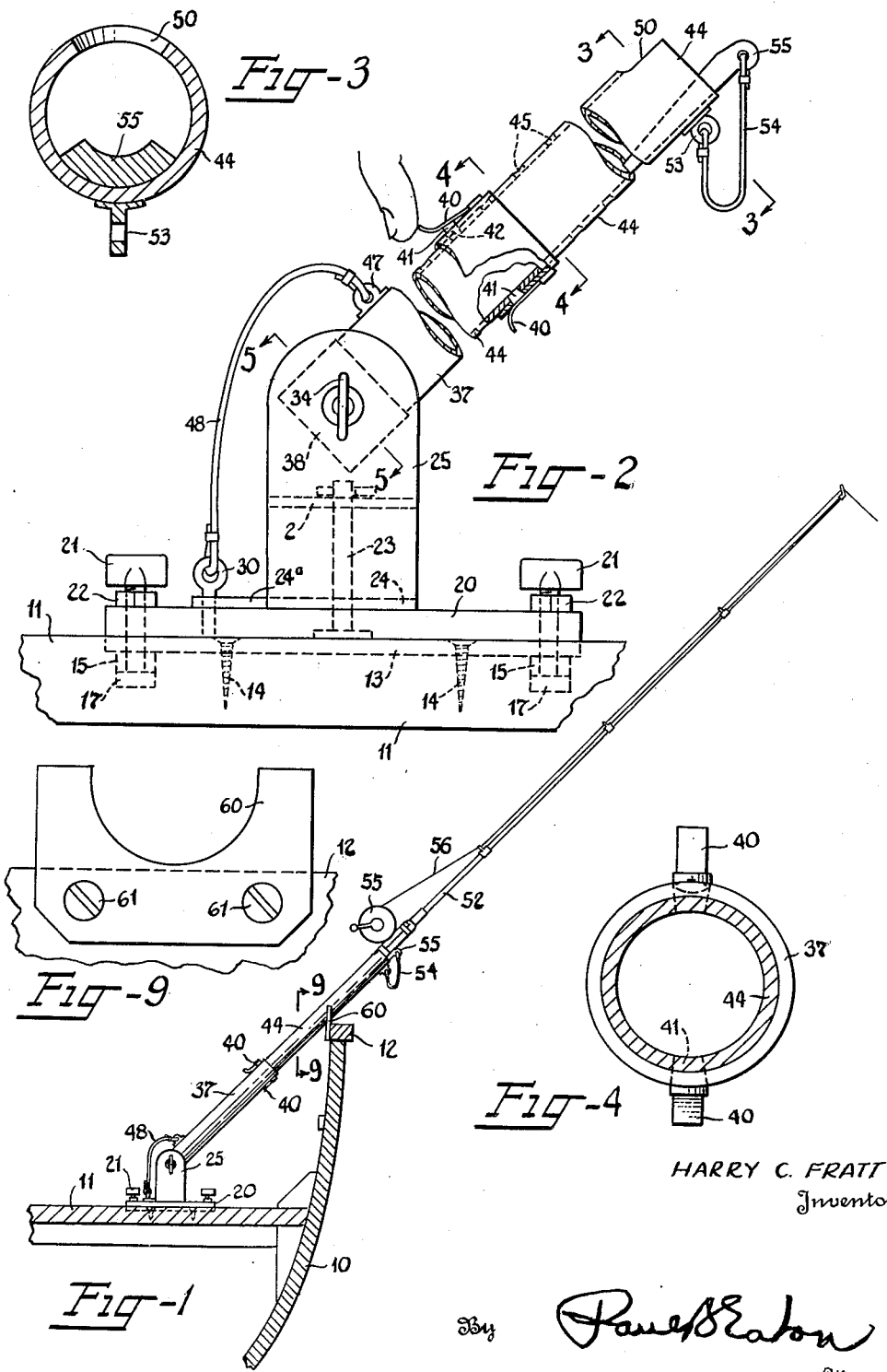

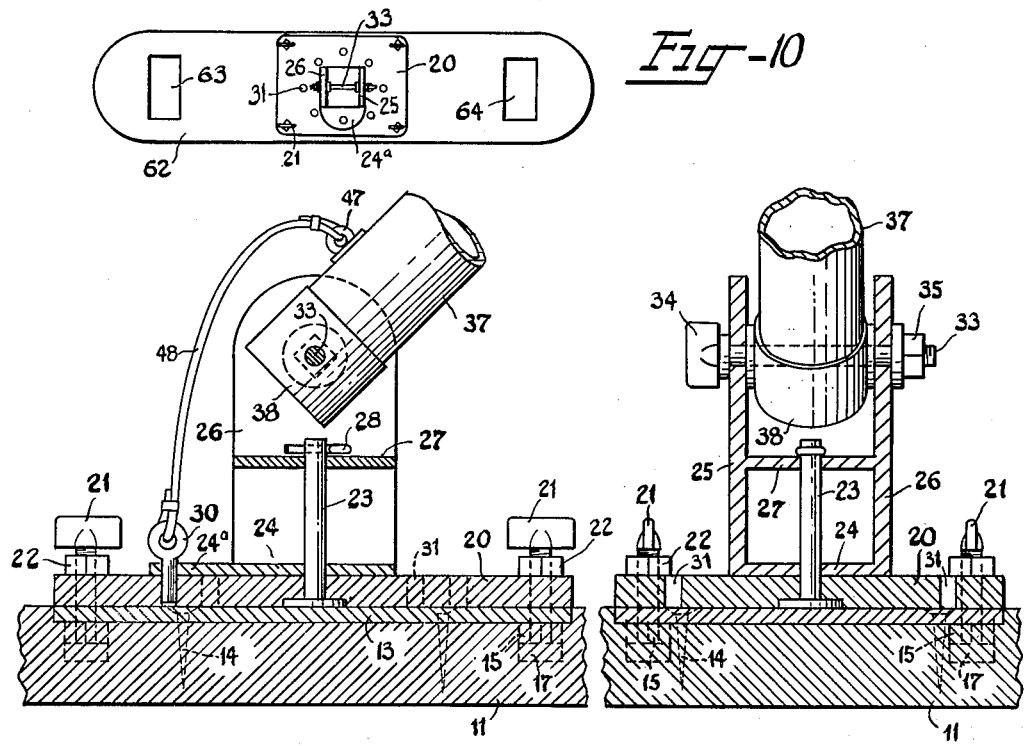

2,529,148

UNITED STATES PATENT OFFICE 2,529,148

ROD AND REEL HOLDER

Harry C. Fratt, Norristown, Pa.

Application October 1, 1945, Serial No. 619,495

1 Claim. (Cl. 248—42)

This invention relates to an apparatus for holding a fishing rod and reel in such a manner as to prevent its being snatched from the hands of a fisherman, or from being carried away by a fish suddenly striking the hook and carrying away the rod and reel when it is not held by the hand of the fisherman.

It very often happens that in fishing there will be long periods of time in which the fish will not bite and the fishermen will place their rods and reels on the deck of a boat, or lean the same up against the rail of the boat, and then a fish or a school of fish will pass by and strike the hook or hooks on one or more of the rods, and the rods and reels will be snatched into the water and lost.

It is an object of this invention to provide means which can be attached to the deck of a boat, or which can be secured in any other suitable manner, and having means thereon for holding the rod and reel, and said apparatus having means whereby its angularity as to direction of pointing and also the angularity of the rod and reel with respect to the vertical can be adjusted.

It is another object of this invention to provide a rod-holding means for fishermen whereby the rod can be directed at any elevation and at any angle with respect to the boat and will be securely held so that it cannot be snatched away by a fish suddenly making a strike, as the pull will be downward and the rod cannot be removed from this holding apparatus, yet the rod and reel can be quickly removed from the apparatus should the fisherman desire to play the fish by removing the rod and reel from the holding apparatus.

It is another object of this invention to provide a rod- and reel-holding apparatus for fishermen comprising a base member having means for attaching the same to the deck of a boat, or providing means whereby it can be held in position by a chair in which the fisherman is sitting, and having an expansible or telescopic tube adjustably mounted on the base and being adjustable as to angularity with respect to the vertical and, also, being adjustable so that the rod can be pointed in any direction with respect to the boat.

Some of the objects of the invention having been stated, other objects will appear as the description proceeds when taken in connection with the accompanying drawings in which:

Figure 1 is an elevation of the apparatus showing a rod and reel in position and showing a portion of a boat in section with the rod- and reel-holding apparatus therewith;

Figure 2 is an elevational view of the lower portion of Figure 1 and showing the same on an enlarged scale and omitting the rod and reel;

Figure 3 is a transverse sectional view taken along the line 3—3 in Figure 2;

Figure 4 is a transverse sectional view taken along the line 4—4 in Figure 2;

Figure 5 is a sectional view taken along the line 5—5 in Figure 2 and omitting the uprising members on each side for holding the lower end of the tube;

Figure 6 is a top plan view of the apparatus as shown in Figure 2 and showing the upper right hand portion of the tube arrangement broken away;

Figure 7 is a vertical sectional view taken along the line 7—7 in Figure 6 and showing the tubular portion in elevation, with portions of the tube being broken away;

Figure 8 is a transverse sectional view taken along the line 8—8 in Figure 6 but showing the tubular portion in elevation with portions of the tube being broken away;

Figure 9 is a view taken along the line 9—9 in Figure 1 and omitting the tubular portion;

Figure 10 is a top plan view of a modified form of base member.

Referring more specifically to the drawings, the numeral 10 indicates the hull of a boat having a deck 11 thereacross and having a side rail 12. I propose to mount flush with the top surface of the deck 11 a brass plate 13 by means of a plurality of screws 14. This brass plate 13 has a plurality of holes therethrough which have threaded nuts 15 brazed thereto and projecting into cavities 17 in the deck. I provide a plate 20 having a plurality of holes therethrough through which thumb screws 21 may be passed to be threadably engaged by the nuts 15 on the bottom of plate 13. In this manner the base 20 is secured flush with the deck of the boat. The screws 21 have stop nuts 22 threadably secured thereon which are adapted to press against the top of the plate 20 when the lower ends of the screws 21 are threadably engaged by the nuts 15.

Centrally disposed in the plate 20 and projecting upwardly therefrom is a pin 23 around which the base portion 24 of a U-shaped member comprising uprights 25 and 26 is mounted for rotation. These uprights 25 and 26 have bridging the same a horizontally disposed portion 27, and the pin 23 not only penetrates the base portion 24 but also the bridge portion 27, and a suitable fastening means such as a cotter key 28 is secured in the upper end of the pin 23 for rotatably confining the member comprising base portion 24 and uprights 25 and 26 in position. The base portion 24 has an outwardly projecting portion 24a having a hole therethrough through which a pin 30 is adapted to pass and to fit into any one of a plurality of holes 31 in the base portion 20. Thus, it can be seen that the portion 24a can be rotated on pin 23, and the apparatus can be adjusted at any desired angle with regard to the points of the compass.

The upright portions 25 and 26 are penetrated by a bolt 33 having a thumb portion 34 on one end and a nut 35 on the other by means of which the portions 25 and 26 can be pressed towards each other. Rotatably mounted on the bolt 33 is a tubular member 37 having a reinforcing band 38 around its base portion which is also penetrated by the bolt 33. This tubular portion 37 extends upwardly and has one or more spring pressed dogs 40 affixed, each of which has a dog 41 thereon adapted to penetrate a suitable hole 42 in the tubular portion 37. Slidably and telescopically mounted in the tubular portion 37 is another tubular portion 44 having a plurality of holes 45 therein into which the dogs 42 are adapted to project when the tubular portions 37 and 44 are in proper adjusted position. The tubular portion 37 has an eye member 47 welded or otherwise secured thereto to which one end of the string 48 is secured, the other end of the string being secured to pin 30 to prevent its becoming lost. The upper end of the tubular portion 44 has a cutaway or gap portion 50 into which the base portion of a suitable rod 52 may be fitted. The tubular portion 44 also has an eye member 53 thereon to which a string 54 is secured, the other end of the string 54 being secured to a wedgelike member 55 which is adapted to be inserted in the upper end of the tubular portion 44 to wedge the base of the rod in position. This rod has a conventional reel 55 secured thereon, holding a conventional line 56 which extends through suitable eyes in the rod and on the end thereof is adapted to be secured the base or lure, all of which is conventional.

In order to prevent the rod from being pulled sidewise, especially when a very large fish is hung, I may provide a suitable member 60 and secure the same to the rail 12 of the boat by any suitable means such as by screws 61, and in this crescent shaped member 60 is adapted to rest the tubular member 44 which thus prevents the tubular member 44 from being pulled fore or aft the boat.

In Figure 10, I have shown a slightly modified form of anchoring the rod-holding means in which like reference characters apply to the base member and the uprights 25 and 26 for clamping the tubular member 37. The tubular member 37 is omitted, but there it is shown that the plate 20 instead of being anchored to a brass plate flush with the deck, is anchored to a board member 62 having holes 63 and 64 therein so that this board member can be placed on the deck of a boat or, as a matter of fact, can be placed on the ground or strand or on a pier, and an ordinary folding chair can have its front legs inserted through the holes 63 and 64 in board member 62. The fisherman can then sit in the chair and, thus, the holding means for the rod and reel would be anchored and could not be carried away because the chair legs would hold it in position. When the fisherman desired to cease fishing, it could very quickly be removed from the deck of the boat by merely raising the chair out of the holes 63 and 64.

It is thus seen that I have provided a very convenient and easily manipulated rod-and-reel holding apparatus which absolutely prevents the loss of rods and reels because the rod and reel is anchored at all times, and it cannot be pulled out of this holding apparatus when a strike is made and the fisherman does not have control of the rod and reel.

In the drawings and specification there has been set forth a preferred embodiment of the invention, and although specific terms are employed, they are used in a generic and descriptive sense only, and not for purposes of limitation, the scope of the invention being defined in the claim.

I claim:

Apparatus for holding a fishing rod comprising a plate-like base member adapted to be secured to the deck of a boat, a pin rising vertically from the plate-like base member, a substantially U-shaped member having its bottom portion loosely penetrated by said pin and being rotatably mounted on said pin, means for holding the U-shaped member in adjusted position relative to the base member comprising a laterally projecting portion integral with the bottom portion of said U-shaped member and having a hole therethrough and said base member having a plurality of holes herein arranged in an arc of a circle having the same radius as the hole in the laterally projecting portion and into which holes a pin may be inserted, a bolt penetrating the upper ends of the two legs of the U-shaped member, a tubular member having its lower end swingably mounted on said bolt, a nut on said bolt whereby the two legs of the U-shaped member may be pressed against the opposed sides of the tubular member for adjusting the angularity of the tubular member with respect to the vertical, the upper end of the tubular member being adapted to receive the butt end of a fishing rod, the U-shaped member also having a cross portion intermediate its ends also penetrated by said first-named pin, and the first-named pin having removable securing means on its upper end.

HARRY C. FRATT.

REFERENCES CITED

The following references are of record in the file of this patent:

UNITED STATES PATENTS

| Number | Name | Date |
|---|---|---|
| 371,777 | McCabe | Oct. 18, 1887 |
| 419,137 | Bobemerith | Jan. 7, 1890 |
| 1,223,884 | Johnstone | Apr. 24, 1917 |
| 1,967,427 | Puckett | July 24, 1934 |
| 2,184,583 | Danko | Dec. 26, 1939 |
| 2,312,957 | Cannon | Mar. 2, 1943 |